United States Patent

[11] 3,547,228

[72] Inventor Harold V. Wiley
    Morre Bay, Calif.
[21] Appl. No. 794,953
[22] Filed Jan. 29, 1969
[45] Patented Dec. 15, 1970
[73] Assignee Mo och Domsjo Aktiebolag
    Ornskoldsvik, Sweden
    a corporation of Sweden

[54] VEHICLE WHEEL CHOCK ASSEMBLY
    1 Claim, 6 Drawing Figs.
[52] U.S. Cl. .................................................. 188/32
[51] Int. Cl. .................................................. B60z 3/00
[50] Field of Search ...................................... 188/32

[56] References Cited
UNITED STATES PATENTS

| | | | |
|---|---|---|---|
| 2,521,539 | 9/1950 | Richardson | 188/32 |
| 2,773,564 | 12/1956 | Garard, Sr. | 188/32 |
| 2,870,872 | 1/1959 | Rapp | 188/32 |
| 3,113,642 | 12/1963 | Lay | 188/32 |
| 3,305,050 | 2/1967 | Newberry | 188/32 |

FOREIGN PATENTS

| | | | |
|---|---|---|---|
| 675,784 | 11/1929 | France | 188/32 |

Primary Examiner—George E. A. Halvosa

ABSTRACT: This invention relates to a vehicle chock assembly in which two chock blocks are pivotally connected together to facilitate handling of the blocks and to facilitate placing the blocks between and removing them from two wheels on the same side of two tandem axles.

PATENTED DEC 15 1970

3,547,228

INVENTOR.
Harold V. Wiley

VEHICLE WHEEL CHOCK ASSEMBLY

SUMMARY OF THE INVENTION

A wheel chock assembly has a pair of chock blocks each adapted to be placed between the narrowing space defined by a surface and a wheel resting on said surface to prevent the wheel from rolling. A first pair of arms is pivotally connected to one block and a second pair of arms is pivotally connected to the other block. The first and second pair of arms are pivotally connected to one another and one set of arms has a handle whereby the entire assembly may be manipulated from the handle to place the chocks in position between two wheels and to remove them from said position.

DESCRIPTION OF THE PREFERRED EMBODIMENT

Figure 1:
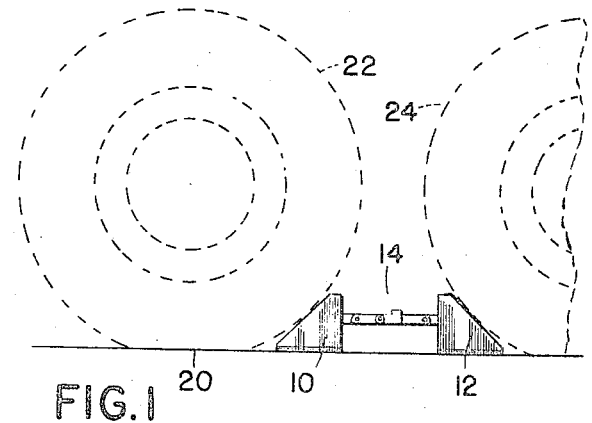
FIG. 1 is an elevational view of chocks in place between two wheels of a trailer or like vehicle.

Referring to the drawings in detail wherein for the purpose of illustration I have disclosed a preferred embodiment of the invention, the device consists essentially of two hollow metal blocks 10 and 12, each made of pieces of flat iron welded together. The two blocks 10, 12 are joined to one another by a pivotal connecting mechanism indicated generally at 14. As will be apparent form the drawings, the blocks 10 and 12 each have a tapered side 16 and 18 respectively, which are adapted to fit into the gradually narrowing spaces between a surface 20 and the tires 22 and 24 which are resting on said surface 20. Alternatively, the sides 16 and 18 may be arcuate. In FIG. 1, the two blocks 10, 12 are positioned between the two tandem wheels 22 and 24 on one side of a vehicle, for example, a tandem two-axle travel trailer. It will be apparent in FIG. 1 that the two blocks 10 and 12 will prevent the trailer on which the two wheels 22 and 24 are mounted from rolling forward or backward.

The connecting mechanism 14 between the two blocks 10 and 12 consists of two lugs 26, 28 welded to the block 10 and two lugs 30, 32 welded to the block 12. The lugs 26 and 28 have holes for supporting a shaft 34, the latter in turn pivotally mounting a pair of arms 36, 38. Suitable washers and cotter pins may be provided on the ends of shaft 34 to effect the pivotal connection.

The lugs 30, 32 also have holes for supporting a shaft 40, the latter in turn pivotally mounting a pair of arms 42, 44. Here again, washers and cotter pins may be provided on the ends of the shaft 40.

Figure 3:
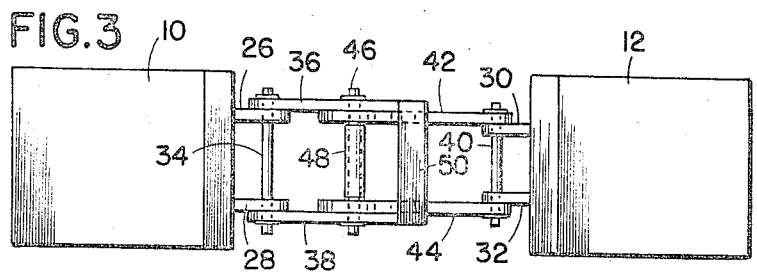
FIG. 3 is a plan view of the chocks fully extended.
Figure 4:
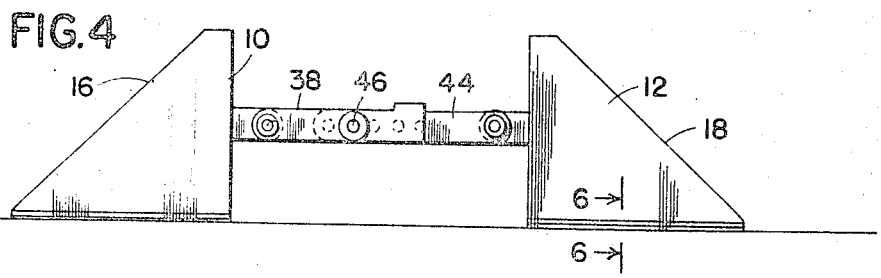
FIG. 4 is an elevational view of the chocks fully extended.

The two arms 36, 42 and 38, 44 are pivotally connected to one another by a third rod 46, the two arms 36, 38 straddling the two arms 42, 44 as shown in FIG. 3. A short piece of tubing on the rod 46, 48 serves to keep the arms separated on the shaft 46. The ends of the shaft 46 may be provided with washers and cotter pins. The two arms 36, 38 are joined to one another by a cross member defining a handle 50.

From the above description it will be apparent that the blocks 10, 12 can easily and readily be placed and removed from between the two wheels 22, 24 merely by grasping the handle 50. Thus, to remove the blocks, the handle 50 is lifted to the position shown in FIG. 2, whereby the arms 36, 38, 42 and 44 pivot as shown and the blocks are displaced from under the wheels 22, 24 from the FIG. 1 to the FIG. 2 position.

Figure 5:
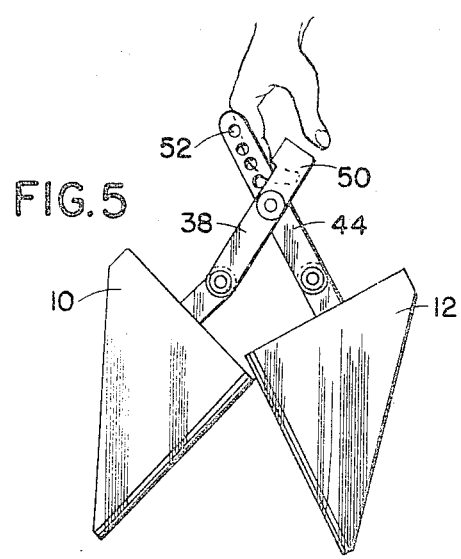
FIG. 5 is an elevational view of the chocks as they are lifted by the handle.
Figure 6:
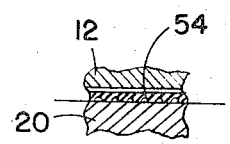
FIG. 6 is a fragmentary sectional view taken along the line 6—6 of FIG. 4.

To completely remove the blocks, the user need only lift the whole chock assembly out of place as shown in FIG. 5 whereby the handle 50 serves as a convenient means for handling and transporting the blocks from place to place.

Figure 2:
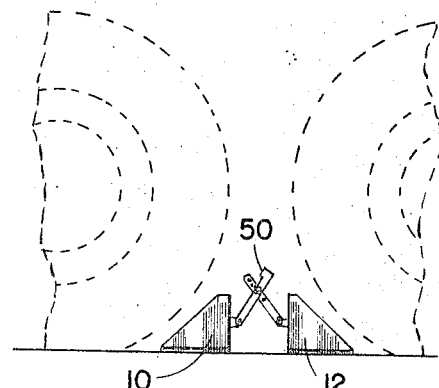
FIG. 2 is an elevational view of the chocks shown in FIG. 1 but in a different position wherein the chocks have been disengaged from the wheels.

It will be apparent, that the blocks may be installed in place in the FIG. 1 position merely by reversing the above procedure. Thus, once the blocks are located in position as shown in FIG. 2, it is a simple matter to depress the handle 50 to obtain the FIG. 1 position.

In some cases the two wheels 22, 24 may be further apart or closer together. To provide for this, a plurality of holes 52 are made in the arms 42, 44 so that by changing the shaft 46 into different sets of holes 52, the distance between the two blocks may be adjusted. Expressed otherwise, the holes 52 provide for adjustment of the longitudinal length of the combined two pairs of arms when the latter are in a horizontal position and the two blocks are in position under the wheels.

To prevent slippage of the blocks 10, 12, antislip means 54 in the form of a rubber sheet having indentations or threads may be cemented to the bottom of the block.

In view of the foregoing description taken in conjunction with the accompanying drawings it is believed that a clear understanding of the device will be apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

I claim:

1. A wheel chock assembly adapted to be placed between two tandem wheels mounted on the same end of a pair of tandem axles, comprising a pair of blocks each adapted to be placed between the tow opposite narrowing spaces defined by a surface and each of the two tandem wheels resting on said surface to prevent said wheels from rolling, each of said blocks, when in position on said surface, having an inclined or arcuate face engaged each of said two wheels and a back face with the back face of each block being spaced from one another, a first pair of rigid arms pivotally connected to one of said blocks, a second pair of rigid arms arms pivotally connected to the other of said blocks, means pivotally connecting said first pair of arms to said second pair of arms whereby the two pairs of arms pivotally connect the two blocks together to facilitate handling of the two blocks as a unit, a handle extending between each arm of the first pair of arms whereby the entire assembly may be manipulated from said handle, one of said pairs of arms having a plurality of openings to provide for adjusting the location of the pivotal connection between said pairs of arms, means on said arms to adjust the longitudinal length of the combined two pairs of arms when the latter, including the handle, are in a horizontal position and the two blocks are in place under the two tandem wheels, and means forming an antislip surface on the bottom of said blocks.